United States Patent [19]
Shah et al.

[11] Patent Number: 6,112,280
[45] Date of Patent: Aug. 29, 2000

[54] METHOD AND APPARATUS FOR DISTINCT INSTRUCTION POINTER STORAGE IN A PARTITIONED CACHE MEMORY

[75] Inventors: Lacky V. Shah, Sunnyvale; James S. Mattson, Jr., Campbell; William B. Buzbee, Half Moon Bay, all of Calif.

[73] Assignee: Hewlett-Packard Company, Palo Alto, Calif.

[21] Appl. No.: 09/003,568

[22] Filed: Jan. 6, 1998

[51] Int. Cl.[7] ...................................................... G06F 9/42
[52] U.S. Cl. .......................... 711/129; 711/135; 711/156; 711/165; 711/173; 711/202; 711/213; 712/200; 712/204
[58] Field of Search ...................................... 711/129, 133, 711/134, 135, 153, 156, 159, 165, 173, 202, 204, 213; 712/13, 200, 204

[56] References Cited

U.S. PATENT DOCUMENTS

| | | | |
|---|---|---|---|
| 4,382,278 | 5/1983 | Appelt | 711/122 |
| 5,354,232 | 10/1994 | Pontow | 711/118 |
| 5,404,500 | 4/1995 | Legvold et al. | 714/6 |
| 5,420,993 | 5/1995 | Smith et al. | 711/206 |
| 5,870,576 | 2/1999 | Faraboschi et al. | 712/210 |

OTHER PUBLICATIONS

"Garbage Collection Algorithms for Automatic Dynamic Memory Management" by Richard Jones and Rafael Lins; Copyright 1996 by John Wiley & Sons Ltd., England; cover page; inside cover page; pp. 143–152.

*Primary Examiner*—B. James Peikari

[57] ABSTRACT

There is disclosed a dynamic cache which is divided into sections, or chunks, for the storage of optimized code. The optimized code may contain pointers to code in other chunks. When a cache chunk is to be reused, then the pointers to other caches, as well as the pointers from other caches to code contained with the cache that is to be removed, are changed to point to either code contained in a victim chunk of the cache, or, alternatively, to point back to the translator. The system can dynamically change the number and size of the cache chunks and the number and size of the victim chunks, if any.

37 Claims, 2 Drawing Sheets

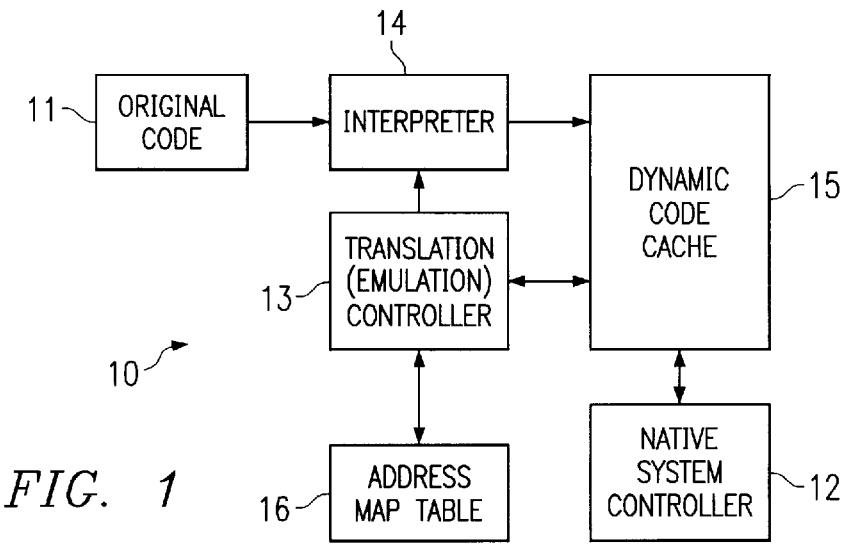
*FIG. 1*
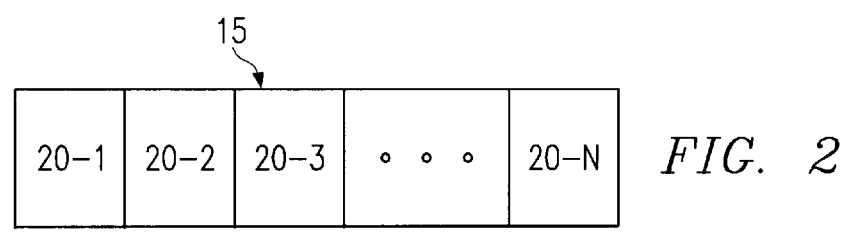
*FIG. 2*
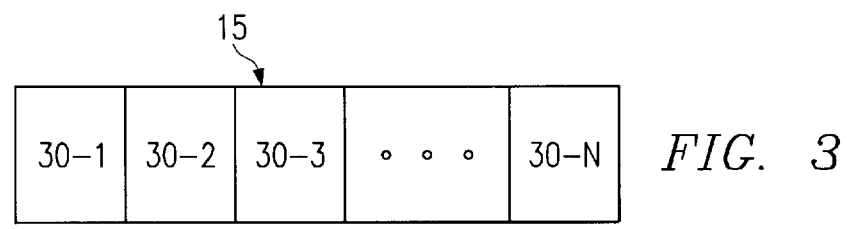
*FIG. 3*
*FIG. 5*
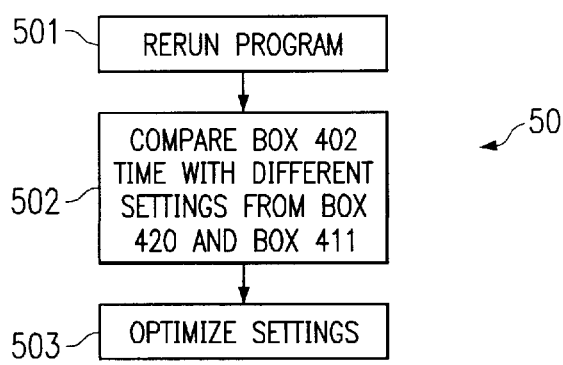

METHOD AND APPARATUS FOR DISTINCT INSTRUCTION POINTER STORAGE IN A PARTITIONED CACHE MEMORY

RELATED APPLICATIONS

Reference is hereby made to the following co-pending and commonly assigned U.S. patent applications entitled DYNAMIC BINARY TRANSLATION SYSTEM WHICH PERMITS THE SAFE SPECULATION OF TRAPPING OPERATIONS Ser. No. 09/003,572 and METHOD AND APPARATUS FOR THE INTER-OPERATION OF DIFFERING ARCHITECTURAL AND RUN-TIME CONVENTIONS, Ser. No. 09/003,513, respectively.

TECHNICAL FIELD OF THE INVENTION

This invention relates in generational to code cache management and more particularly to a system and method for dynamically optimizing a general code cache manager.

BACKGROUND OF THE INVENTION

Typically, the manner of reducing the time it takes a computer application (such as an .exe file) is to use a faster CPU. An alternative is to complile the application using optimization techniques which will cause the application to run faster. While these arrangements work well, there exists a good number of applications which for various reasons cannot be recompiled.

Thus, it is desired to run existing code faster without changing CPU's and without recompiling the code.

One method of accomplishing this desire is to use a faster run-time compiler and process the code, perhaps with look ahead and other "fast" techniques. This will work, but often there is code that can be compiled, but which will be used many times during the course of the run-time process. When this occurs, it would be helpful if the faster code sequences could be stored from time to time in a cache memory.

Such cache storage is possible but results in several problems, mostly having to do with speed of operation. If the cache is too large, then the retrieval time goes higher than tolerable. The limitation is on the physical memory of the machine. If the cache is too large, physical memory may be exhausted resulting in increased paging activity and overall decreased performance. If the cache is too small, then the code sequences cannot be stored properly or not enough of the sequences can be stored to make a real difference in processing time. A further problem exists in that the code sequences may contain pointers to other code sequences and thus these pointers must be retained along with the various code sequences.

SUMMARY OF THE INVENTION

These and other objects, features and technical advantages are achieved by a system and method which causes the application to run a different piece of code to do exactly the same thing as the original code, only doing it faster. This is accomplished at run-time where a new set of code is used which contains faster sequences of operation. Portions of this new (faster) code are placed in a dynamic code cache and read from the cache instead of being compiled each time during run-time. Thus instead of the application executing the original instructions, it executes the instructions in the code cache. The instructions in the code cache do exactly what the application was supposed to do, except the new code makes the instructions run faster. As a result, the total application takes less time to execute than it was originally supposed to.

When the system determines that a plurality of instructions are critical to the application, it selects those instructions, optimizes them, and places the optimized versions in the code cache. The code cache, however, cannot be of unlimited size, because it will then take too much memory and will end up slowing the application down instead of speeding it up. So the code cache must be a limited size. Thus instructions are continually added to the code cache. The code cache, being of limited size, will usually become full and some entries will have to be removed to make room for new entries. Simply dropping code from the cache will not work since some of the code contains pointers to other portions of the code and dropping the pointers will cause the code to not perform properly. In operation, the code cache is divided into sections, called chunks, with each chunk containing optimized code plus pointers to other chunks, or pointers back to the emulator. The system maintains information only about branches that cross chunks, because they are the only branches that must be passed when a chunk is eliminated. This then allows for the removal of all translations belonging to the same chunk. In this fashion, the chunks are used in a round robin fashion with the assumption that at a given time the more recently performed translations (first-in first-out) are more important to keep than are the ones performed a long time back.

In this context, a chunk is like a block of code or several blocks of code that may contain pointers to each other. Chunks do contain pointers to code in other chunks, as well as pointers back to the emulator. That is why when one chunk is removed, all the pointers to that chunk from other chunks and all the pointers from that chunk to other chunks (and to the emulator) must be changed. The system tries to minimize cross chunk pointers.

Thus, it is one feature of the invention to design a system and method that maintains a list of all translations in the code cache and maintains information as to where the branches and the translations have been passed, so that when the code cache becomes full, instructions are moved out of the code cache in an organized manner so as to preserve information pertaining to those branches that were pointing to the translations that are being removed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 shows one embodiment of a translation system in which the inventive concept can be used;

FIG. 2 shows the code cache organized in one embodiment where all chunks are used on a round robin basis to show optimized code;

FIG. 3 shows the code cache organized in another embodiment where less than all of the chunks are used to store code, and at least one of the chunks stores data other than the optimized code;

FIG. 5 shows one method of optimizing the system.

DESCRIPTION OF THE PREFERRED EMBODIMENTS

Figure 4:
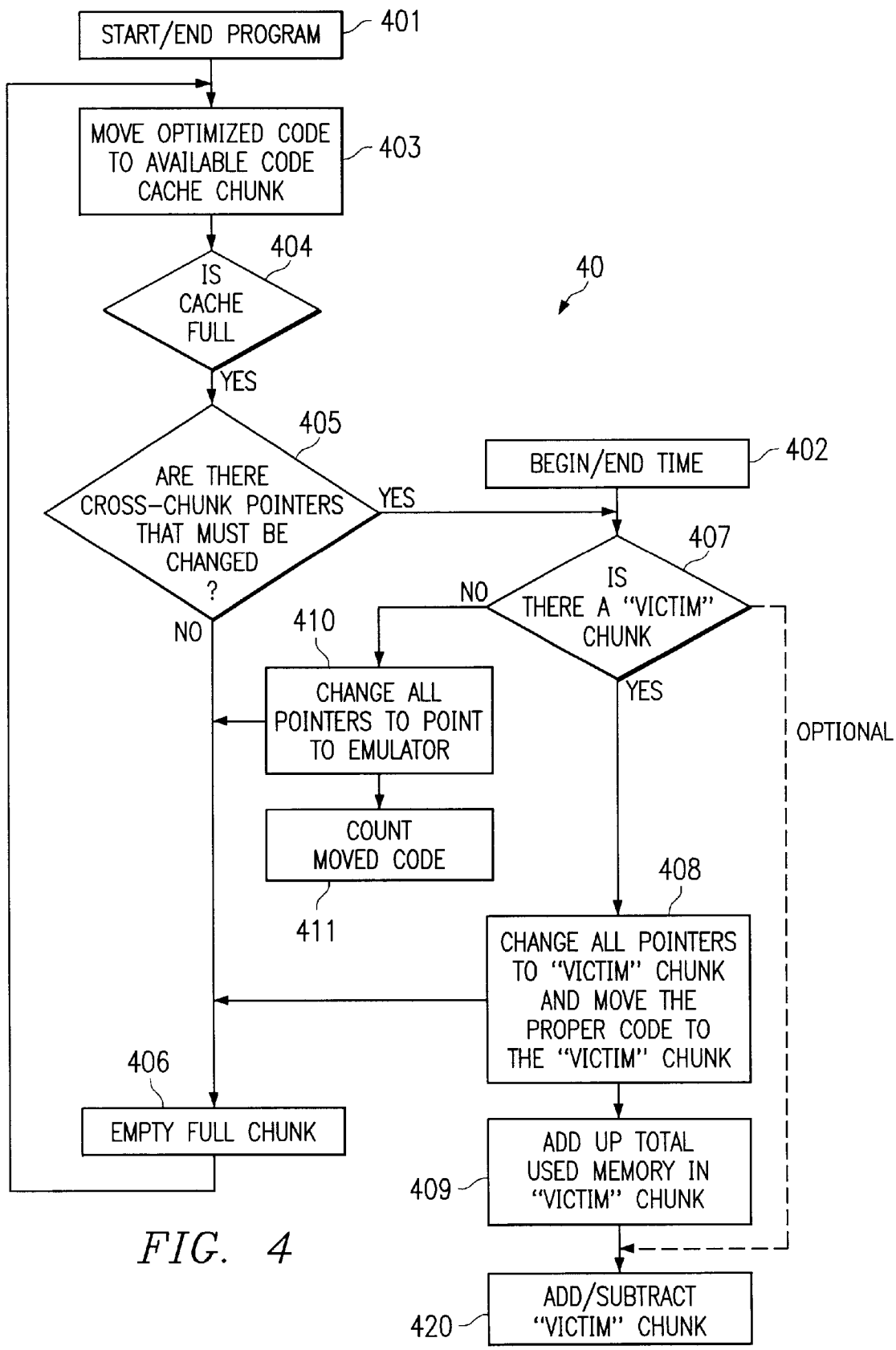
FIG. 4 shows a flow chart of the system and method of operation of the invention.

Before beginning a discussion of the operation of the code cache, it might be helpful to briefly review the operation of one embodiment where the invention might be used. Thus, turning now to FIG. 1, there is translator 10 interacting with original client code 11 and native system controller 12. Translator controller 13 manages the translation process, including deciding when to translate a code region. Controller 13 also manages mode switches between dynamic code and the interpreter. As shown in FIG. 1, interpreter 14 translates original client code 11, in an instruction by instruction manner, and inputs the translated code into dynamic code cache 15. the operation of a preferred embodiment in which dynamic code cache 15 can be utilized is shown in concurrently filed copending patent application, Ser. No. 09/003,572 entitled "Dynamic Binary Translation System Which Permits the Safe Speculation of Trapping Operations."

Controller 13 then may reorder the translated instructions in code cache 15. Native system controller 12 then executes the reordered contents of code cache 15. If controller 13 decides not to reorder the instructions, then native system controller 12 executes the contents of code cache 15 as is. Address map table 16 is used by controller 13 in deciding whether to reorder code, and stores checkpoint locations in original client code 11, as well as locations of traps in original client code 11. Note that both the original client code and the dynamically generated native code or dynamic code are present in the process' virtual address space.

In addition to emulating instructions, the interpreter profiles the branch behavior of client code 11 to detect regions of code suitable for reordering. Translator 10 converts those regions to dynamic code and caches them in a buffer. Each time code 11 branches, the address table is searched to determine if the target code has already been translated. If it has been translated, transfer is controlled to the dynamic code block corresponding to the region of client code that the application intends to execute. Otherwise, the control system decides whether to translate and reorder the code or merely to have the interpreter emulate the client instructions one-at-a-time until the next branch. Branches leaving dynamic code either branch back to controller 13, or they can be dynamically linked to other dynamic code blocks using a chaining mechanism.

The technique that is used by the inventive translator is to first generate a translation for a group of instructions, or block of code, and then to reorder the translated instructions with respect to their original order, according to various optimization procedures. However, the instructions are scheduled or ordered in such a manner, that even if they are executed out of order, it is always possible to back out of the effects of executing them out of order and roll back to a check point. A check point is a point in the translated code which corresponds to a point in the original program such that all operations appear to have executed sequentially.

When an application is started, the emulator emulates one instruction of the application at a time. Thus, the emulator does what the application calls for except that it is slower because of emulation overhead. The system associates counters with instructions that are executed fairly often. When the counters reach certain thresholds, the system takes a plurality of instructions called a trace, and places that trace in the code cache. The trace contains branches (pointers) going to different instructions in the old executable code. Thus, when the code from the code cache is used, it provides branches pointing to something called trampoline code. This trampoline code passes the proper arguments to the emulator telling the system where to next continue emulation from. For example, if there was a branch that was pointing to instruction 100, the trampoline code would tell the emulator to start emulating at instruction 100.

In typical fashion then, the emulator, will skip to instruction 100 instead of the instruction where it would have been. Now it may so happen that the set of instructions beginning at 100 have been placed into the code cache. So now the original branch which was going back to the emulator, the trampoline branch passing the arguments of 100, can be redirected, or pointed, to the new translation in the code cache instead of going back to the emulator. So as a result, often the system will be only executing instructions from the code cache because new instructions are being added to the code cache along with pass branches so control of the execution stays within the code cache rather than coming out back to the emulator in most cases. By executing optimized instructions mainly in the code cache, the system will take lesser time to execute a program than it originally did.

As shown on FIG. 2, the code cache is divided into multiple chunks 20-1 through 20-N. Each chunk is used in a round robin fashion. The number of chunks and the size of each chunk is a configurable parameter. In a preferred embodiment the code cache would be 4 Mbytes and would be divided into four chunks, with each chunk having 1 MByte of memory. Note that the number N is variable as is the total cache size. Also note that the chunks do not have to be of equal size.

Initially when the system places the optimized set of instructions into code cache 15, they are usually placed in chunk 20-1 first until chunk 20-1 is full. If there are any branches that branch from any optimized code in chunk 20-1 to any other optimized code in chunk 20-1, the system does not have to keep any information on those branches (pointers) as they will be maintained within the chunk in association with the stored code to which the pointer pertains.

After chunk 20-1 is full, the next set of optimized instructions are placed in chunk 20-2. It is possible that instructions in chunk 20-1 will branch to chunk 20-2 and vice versa. The system will keep information about those cross chunk pointers because, as will be detailed, it is possibly that one of the chunks will be removed at some later time when the code cache is full or for other reasons. Note that the system can go through the code to optimize the code in the different chunks to reduce the number of cross chunk branches.

In FIG. 2 when the system fills 20-N and still has more code, then chunk 20-1 (first-in first-out) is removed completely and all the pointers pointing to chunk 20-1 from chunks 20-2, 20-3 to 20-N are reset to point back to the emulator (box 13, FIG. 1). After chunk 20-1 is refilled and more code must be stored, then the existing code is removed from chunk 20-2 and chunk 20-2 is filled with new code. All the pointers in chunks 20-1, 20-3, 20-N which pointed to chunk 20-2 are reset.

FIG. 3 shows an alternative embodiment where not all of the chunks are filled. In FIG. 3 the system only fills chunks 30-1, 30-2, 30-3 to 30-(N-1). In this situation when it is necessary to refill chunk 30-1, that chunk is emptied. However, instead of the pointers pointing to chuck 30-1 from the other chunks being reset to point to the emulator, they are reset to point to chunk 30-N. The translations which are the targets of these cross chuck pointers are then also moved to chunk 30-N. The rest of the translations are removed from chunk 30-1 completely. Thus, in operation, the instructions need not be passed to the emulator.

There are pros and cons of both embodiments. When the embodiment of FIG. 2 is used, the system uses the entire code cache thereby eliminating the need for removal of code and refilling. The good aspect of this is that the entire code cache is used, but, in doing so, on refills, the system must change a lot of branches to point back to the emulator and thus the system will have to retranslate and optimize the instructions that were contained in chunk 20-1 when chunk 20-1 was removed.

This system, however, may yield good results if the application is not large. Depending upon program size and cache size, the arrangement shown in FIG. 3 can be faster for some applications. One method of optimizing between the embodiments would be to make the size of the chunks and even the number of chunks dynamically changeable and to make the 30-N (FIG. 3) chunk (the "victim" chunk) variable in size so as to optimize the amount of memory required for code storage against the need for pointer storage. This can be accomplished by controller 12 or by some other controller which looks, perhaps on a dynamic basis, at the number of "unloads" of the chunks, the number of moved pointers, the time of execution, and balances all of these factors on an application-by-application basis. By running the same program several times under different parameters, the system can retrain itself as to the parameter settings as shown in FIG. 4 in flow chart form. There is shown in FIG. 4 a typical system operation 40 including a method of optimizing the balance between having an "extra" or "victim" block of cache memory, and the need to reduce the refilling of a chunk of the cache.

The program is started as shown in block 401 and optionally a timer is set by block 402. The translation or optimize (item 13, FIG. 1) establishes a block of code that is destined for cache memory and transfers that block to the first available cache space, which, by way of example, can be chunk 20-1 in FIG. 2 or chunk 30-1 in FIG. 3. These blocks would be stored in a sequential fashion, or in any other well-known fashion, in cache 15 until such time as there is no more available cache space. This operation is controlled as shown in boxes 403 and 404.

When cache 15 is full (i.e., chunks 20-1 to 20-N in FIG. 2 or chunks 30-1 to 30-(N-1) in FIG. 3 are full, then the system operates to remove the code from the chunk that has been stored in the cache the longest. Note that while it would usually be the code that has been stored the longest that would be removed, there are instances that would argue for other code to be removed. For example, if a chunk of the cache did not have any pointers to or from that chunk, it might be better to remove that chunk than to remove the "oldest" stored code.

First, however, the system must determine if the chunk to be removed contains any pointers to code in any other cache chunk or if any other cache chunks (other than the chunk to be refilled) contains pointers to any of the code within the chunk from which the code is to be removed.

This is shown at box 405. This can be determined dynamically if desired or can be determined when the code was first stored and this determination stored for use at this time. If there are no such pointers, then the selected cache is emptied at box 406.

In the event that pointers do exist, then the system determines, box 407, if there is a "victim" chunk, such as chunk 30-N in FIG. 3, assigned. If there is optimization testing going on (an option only), then box 420 would serve to add (or subtract) space to the victim chunk. If there is a victim chunk available, then box 408 serves to move all of the code identified with the pointers, via box 405, to the victim chunk, chunk 30-N FIG. 3, and to then change the pointers so that they reflect the new code location. If there is no victim chunk designated (as in FIG. 2) or if the victim chunk is otherwise unavailable, then the identified pointers are changed to point to translation (emulation) controller 13, FIG. 1, via box 410. In either event, if the optional testing routine were being run for optimization purposes, then box 409 or box 411 would keep track of the number of such pointers and the amount of victim memory required.

Arrangement 50, shown in FIG. 5, is an optional test optimization routine that performs the optimization function during several rerunnings of an application program, via box 501, by comparing via box 502 the parameters generated by various scenarios. These comparisons from time to time serve to optimize the performance of the system via box 503 so that the system performs a particular application faster. The system could change the number of Mbytes available for the code cache, or it may change the number of Mbytes per chunk, or it may change the number of chunks, or it may change the number, if any, of the chunks used for the victim chunk, or it may change the number of bytes within the victim chunk or it may change any combination of these.

Although the present invention and its advantages have been described in detail, it should be understood that various changes, substitutions and alterations can be made herein without departing from the spirit and scope of the invention as defined by the appended claims.

What is claimed is:

1. The method of translating code from one application to another wherein a translator identifies new blocks of code to be stored in a cache to be stored by a computer system in substitution for certain older original code sequences, certain of said new blocks of code having pointers pointing to certain portions of said new code blocks and certain portions of said new blocks of code being pointers to other blocks of code, the method comprising the steps of:

filling first one part then other parts of said multipart cache with new blocks of code;

removing code from an entire selected part of said cache when said cache is full; and concurrently with said removal of code from a selected part of said cache, storing in a different memory all of the pointers which point from said removed code to blocks of code outside said selected part of said cache.

2. The method set forth in claim 1 wherein said last-mentioned step includes the step of changing the pointers outside of said cache part which pointers point to any portion of said removed code.

3. The method set forth in claim 2 wherein said changing step further includes the step of changing said pointers to point to said translator.

4. The method set forth in claim 1 wherein said storing step includes the step of moving said pointers to an allocated location within said cache.

5. The method set forth in claim 4 wherein said allocated location is equal in size to one of the parts of the cache.

6. The method of claim 1 wherein the cache is divided into N parts and wherein said different memory is one of said N parts of said cache.

7. The method set forth in claim 6 further including the step of dynamically establishing the size of each of said N parts.

8. The method set forth in claim 1 further including the step of dynamically establishing the size of said cache memory.

9. A memory cache consisting of N chunks of memory, said memory comprising:

means for holding blocks of optimized code, said code including pointers for pointing to various portions of code;

means for refilling each chunk of memory cache on a selective basis;

means enabled upon the emptying of a chunk of cache from its prior contents for identifying portions of code from said prior contents which are either pointers to other portions of code not contained within said selected refill chunk or which are being pointed to code stored within other chunks of said cache; and means for changing the pointer references pertaining to said identified portions of said refilled code.

10. The memory set forth in claim 9 wherein said cache further includes a special chunk portion of memory for storing therein the code pertaining to said identified pointers, said memory further including means for changing all identified pointers from the other chunks so that they point to code stored within the special storing chunk.

11. The memory set forth in claim 10 wherein all N chunks are used sequentially for storage of blocks of said code.

12. The memory set forth in claim 11 wherein all but 1 chunk is used for the storage of blocks of said code.

13. The memory set forth in claim 12 wherein said 1 unused chunk of said cache is used for the storage therein of portions of said code associated with pointers stored in other of said chunks.

14. The memory set forth in claim 9 wherein N is variable.

15. The memory set forth in claim 9 wherein N is selected on an application by application basis.

16. The memory set forth in claim 9 wherein each N block contains M Mbytes of storage capacity.

17. The memory set forth in claim 16 wherein M is variable.

18. The method of compiling a coded application in a computer wherein the application is written in a first code form and is to be translated into a second code form and wherein the translation process operates to substitute for certain portions of the first code the second code which is more efficient in its execution on the computer, the substitution being accomplished in part by the storage of certain of the second code in a cache memory for periods of time, the cache memory including a plurality of cache chunks, each chunk operable for holding a certain number of second code bits and each such chunk further operable to be refilled by overwriting data bits previously stored in said chunk with new data bytes representative of additional second code, said method comprising the steps of:

identifying all data portions within all but the particular cache containing pointers to data stored within said particular chunk; and prior to storing new data bytes in said particular cache chunk for changing all said identified pointers to a memory location outside of said particular cache chunk.

19. The method set forth in claim 18 wherein said cache contains an auxiliary chunk portion and wherein said changing step further includes the step of:

moving certain portions of said new code from said particular cache chunk to said auxiliary cache; and changing said pointer address to follow said certain moved portions.

20. The method of claim 19 wherein said method further includes the steps of:

identifying all pointers within said particular cache chunk which point to locations outside said particular cache chunk; and prior to storing new data bytes in said particular cache chunk, moving all pointers identified in said last step to said auxiliary cache chunk.

21. The method of claim 18 wherein said cache has n bytes and wherein each said cache chunk is, $$\frac{n}{m}$$

where m is the number of chunks.

22. The method of claim 21 wherein n=4.

23. The method of claim 21 wherein m=4 Mbytes.

24. The method of claim 18 wherein said method further including the step of:

dynamically allocating the size and number of memory chunks within said cache.

25. The method of claim 18 wherein said cache has N chunks each holding M bytes and wherein said method further including the steps of:

filling each chunk in turn sequentially with said new code; and selecting the particular chunk for refill by using first in, first out principles.

26. The method of claim 25 wherein one of said chunks is reserved for only storing therein data bytes pertaining to said identified pointers, and wherein said identified pointers point to addresses within said reserved chunk.

27. The method of claim 18 wherein the address of said identified pointer is a location external to said cache.

28. The method of claim 27 wherein said external address is a translation device which handles both the old and new code.

29. The system of compiling a coded application in a computer wherein the application is written in a first code form and is to be translated into a second code form and wherein the translation process operates to substitute for certain portions of the first code the second code which is more efficient in its execution on the computer, the substitution being accomplished in part by the storage of certain of the second code in a cache memory for periods of time, the cache memory including a plurality of cache chunks, each chunk operable for holding a certain number of second code bits and each such chunk further operable to be refilled by overwriting data bits previously stored in said chunk with new data bytes representative of additional second code, said system comprising:

means for identifying all data portions within all but the particular cache containing pointers to data stored within said particular chunk; and means operative prior to storing new data bytes in said particular cache chunk for changing all said identified pointers to a memory location outside of said particular cache chunk.

30. The system set forth in claim 29 wherein said cache contains an auxiliary chunk portion and wherein said changing means further includes:

means for moving certain portions of said new code from said particular cache chunk to said auxiliary cache; and means for changing said pointer address to follow said certain moved portions.

31. The system of claim 30 wherein said system further includes:

means for identifying all pointers within said particular cache chunk which point to locations outside said particular cache chunk; and means for prior to storing new data bytes in said particular cache chunk, moving all pointers identified in said last step to said auxiliary cache chunk.

32. The system of claim 29 wherein said cache has n bytes and wherein each said cache chunk is, $$\frac{n}{m}$$

where m is the number of chunks.

33. The system of claim 32 wherein n=4.

34. The system of claim 32 wherein m=4 Mbytes.

35. The system of claim 29 wherein said system further including:

means for dynamically allocating the size and number of memory chunks within said cache.

36. The system of claim 29 wherein said cache has n chunks each holding im bytes and wherein said system further including:

means for filling each chunk in turn sequentially with said new code; and means for selecting the particular chunk for refill by using first in, first out principles.

37. The system of claim 36 wherein one of said chunks is reserved for only storing therein data bytes pertaining to said identified pointers, and wherein said identified pointers point to addresses within said reserved chunk.

* * * * *

UNITED STATES PATENT AND TRADEMARK OFFICE
CERTIFICATE OF CORRECTION

PATENT NO. : 6,112,280
DATED : August 29, 2000
INVENTOR(S) : Lacky V. Shah et al.

It is certified that error appears in the above-identified patent and that said Letters Patent is hereby corrected as shown below:

Column 10,
Line 8, delete "im" and insert therefor -- m --

Signed and Sealed this

Twenty-fifth Day of May, 2004

JON W. DUDAS
*Acting Director of the United States Patent and Trademark Office*